Figure 2:
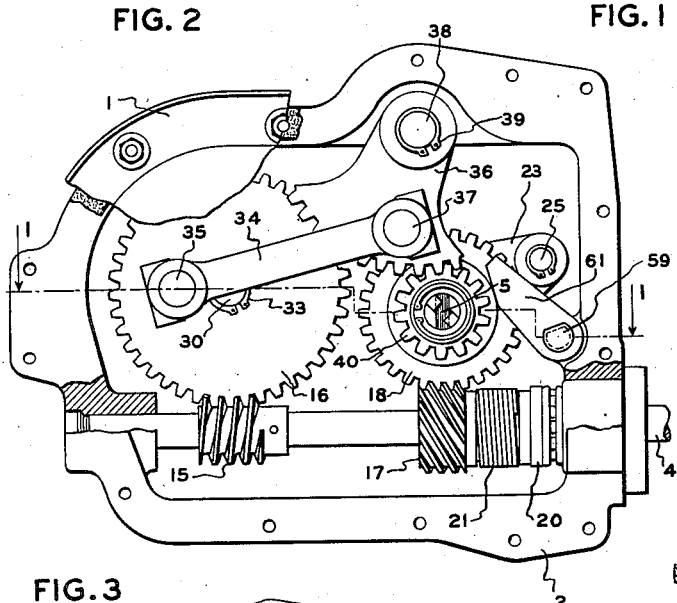

Jan. 7, 1958   M. J. LOEHLE   2,818,736
DRIVE MECHANISM FOR AUTOMATIC WASHING
MACHINES AND THE LIKE
Filed Oct. 27, 1954   2 Sheets-Sheet 1

Inventor:
Max J. Loehle
by *[signature]*
His Attorney

Jan. 7, 1958  M. J. LOEHLE  2,818,736
DRIVE MECHANISM FOR AUTOMATIC WASHING
MACHINES AND THE LIKE
Filed Oct. 27, 1954  2 Sheets-Sheet 2
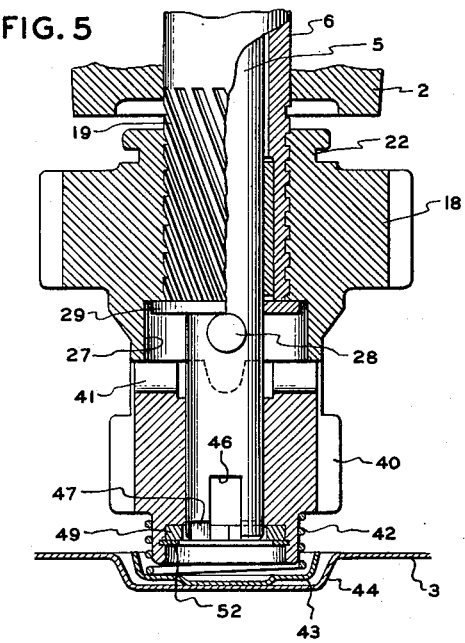
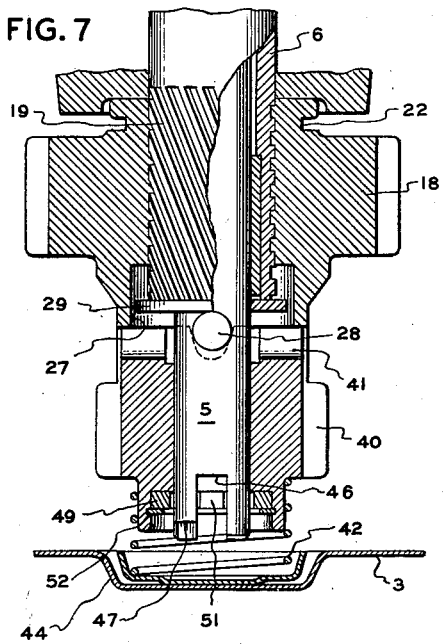
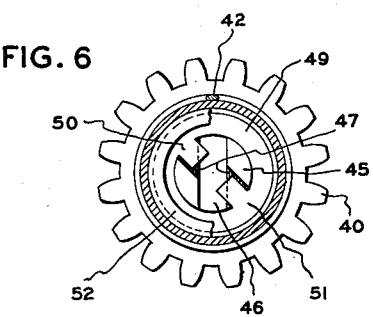
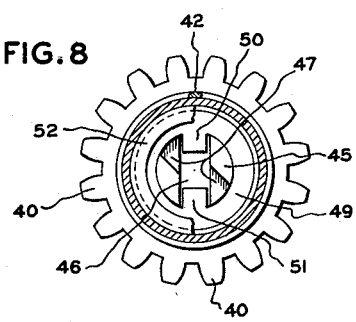
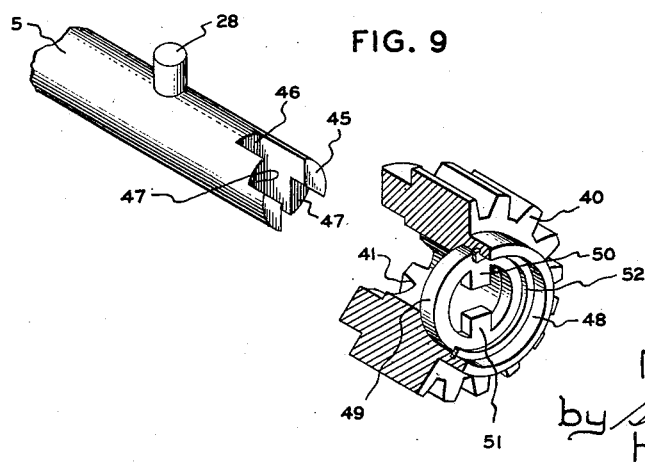
Inventor:
Max J. Loehle
by
His Attorney

United States Patent Office 2,818,736
Patented Jan. 7, 1958

2,818,736

DRIVE MECHANISM FOR AUTOMATIC WASHING MACHINES AND THE LIKE

Max J. Loehle, Louisville, Ky., assignor to General Electric Company, a corporation of New York Application October 27, 1954, Serial No. 465,011

11 Claims. (Cl. 74—81)

This invention relates to drive mechanisms, and in particular to such a mechanism for providing selectively a drive to any one of a plurality of output shafts.

In application Serial Number 404,434, filed January 18, 1954, now Patent No. 2,720,953, issued October 18, 1955, for a "Drive Mechanism for Automatic Washing Machines and the Like" of Carl S. Dayton, assigned to the General Electric Company, assignee of the present application, a drive mechanism is disclosed and claimed of a type especially suitable, for example, for an automatic washing machine. This mechanism, from a reversible input drive source, provides automatically an oscillatory or low speed agitator drive, or a continuous high speed clothes basket drive dependent upon the direction of input rotation.

The present invention is an improvement on the mechanism disclosed and claimed in the aforesaid Dayton application, and has for its primary objectives simplification, reduction in cost, and improvement in reliability of such a mechanism.

A further object of this invention is to provide a transmission from a drive source to low and high speed output shafts, which prevents the low speed drive from becoming effective during high speed rotation.

More specifically, and insofar as it may be applied to an automatic washing machine, it is an object of this invention to provide a transmission from a drive source to oscillatory and a high-speed rotary output shafts, which positively prevents the oscillatory drive from becoming effective during high-speed rotation.

Briefly stated, in accordance with one aspect of this invention, a drive is provided from a power source to high speed and low speed output shafts. In operation the low speed output shaft may be rotating periodically at high speed, for example as the result of frictional drag effect from a high speed shaft. This low speed shaft has journaled thereon a driving member for driving it at a low speed, for example to provide a low speed oscillatory drive for a washing machine agitator. The low speed output shaft is connected to its driving member by a clutch which is engaged by relative axial movement of the driving member and the shaft, with biasing means tending always to engage the clutch. A shift lock free to rotate within the driving member cooperates with means on the low speed shaft to prevent the axial clutch engaging movement while this shaft rotates more rapidly in one direction than its driving member, and permits such clutch engagement when said shaft rotates at a speed less than the speed of the driving member in the same direction.

This invention will be better understood by reference to the following description, taken in connection with the accompanying drawings, and its scope will be pointed out with particularity in the appended claims.

Figure 1:
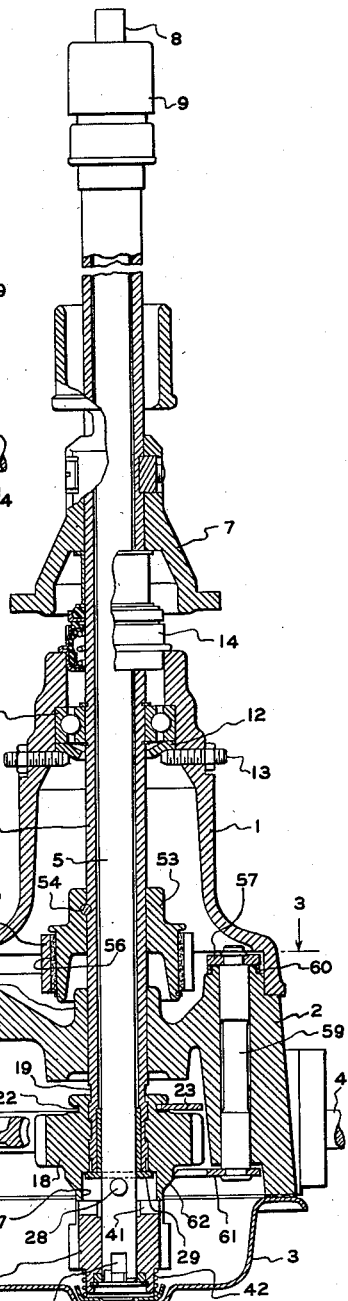
Figure 3:
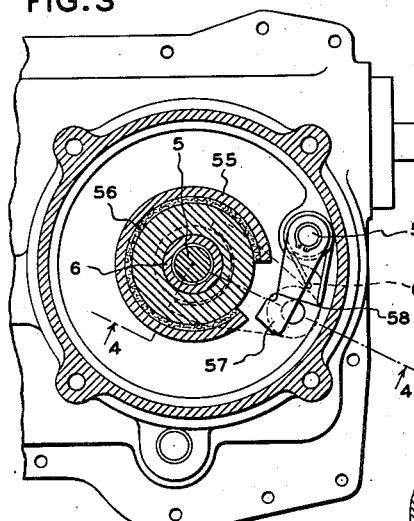
Figure 4:
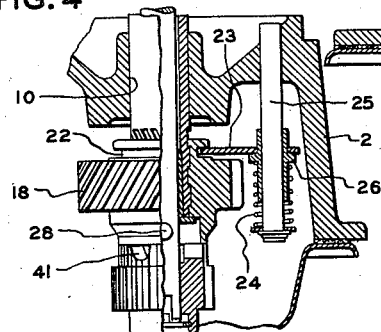

In the drawings, Fig. 1 is a cross-sectional elevation through a drive mechanism in accordance with this invention, taken on the line 1—1 of Fig. 2 in the direction of the arrows; Fig. 2 is a bottom plan view of the device shown by Fig. 1 with certain surfaces broken away, and partially in section to illustrate interior details; Fig. 3 is a cross-sectional view taken on the line 3—3 of Fig. 1 looking in the direction of the arrows; Fig. 4 is a partial cross-sectional view taken on the line 4—4 of Fig. 3 in the direction of the arrows; Fig. 5 is an enlarged cross-sectional elevation of a portion of the device shown by Fig. 1 in one of its operative positions; Fig. 6 is a bottom plan view of the device as shown by Fig. 5 with certain elements removed to illustrate detail; Fig. 7 is an enlarged cross-sectional view, similar to Fig. 5, but with the components in a different operative position; Fig. 8 is a bottom plan view, similar to Fig. 6, with the components in the operative position corresponding to Fig. 7; and Fig. 9 is an expanded perspective view, partially sectionalized, to illustrate more clearly details of certain components involved in the invention.

While this invention is not necessarily limited to a clothes washing machine, it is of particular application thereto since such machines commonly require a drive to a washing or agitation means and a separate drive to a liquid extraction means. For obvious economy reasons it is highly desirable to drive both the extraction and agitation means from a single source of power, such as an electric motor. It is to such a construction that this invention is especially suited, reference being made to the aforesaid Dayton application Serial Number 404,434 for the details of the application of this mechanism to a washing machine.

Referring now to Figs. 1 and 2 of the drawings, a transmission casing in accordance with an exemplary embodiment of this invention is made up in three sections, with an upper section 1, intermediate section 2 and a base pan 3, all secured together by any suitable fastening devices extending through mating flanges to form a sealed casing into which a quantity of lubricant may be placed for the normal operational life of the transmission. Journaled in the central section 2 of the casing is an input shaft 4, driven from an appropriate power source (not shown) selectively in either direction, the direction of input rotation being used to control automatically the drive to an output shaft 5 or to a coaxial output tube, or shaft, 6. Tube 6 has secured thereto a hub 7, which may be connected, for example, to a basket of a washing machine. The inner shaft 5 projects upwardly through tube 6, terminating adjacent its upper end 8 in a drive block 9.

The inside shaft 5 is, of course, journaled in any appropriate manner within tube 6. Tube 6 in turn is journaled within the casing assembly by a lower sleeve bearing 10 and an upper ball bearing 11. The upper bearing carries the axial thrust load and is held in position on the shaft by a pair of snap rings as shown in Fig. 1, with the outer race of the bearing secured within a shouldered recess in the casing by a pressure ring 12 engaged by a plurality of set screws 13. The upper opening in casing section 1, through which the shafts pass is closed by an appropriate shaft seal assembly 14 of any appropriate design to prevent entrance of dirt, liquid, moisture, or other foreign materials into the otherwise sealed transmission casing.

The input drive, as previously stated, is through shaft 4. This single input shaft provides the drive through either a low speed gear train to shaft 5 or a high speed gear train to tube 6. For the low speed drive, a worm 15 is pinned to input shaft 4 meshing with a worm wheel 16. The high speed drive is accomplished through a spiral gear 17 journaled on shaft 4, meshing with spiral driven gear 18 having a connection with tube 6 through a spiral spline 19, as shown most clearly in Figs. 5 and 7. To provide a drive between shaft 4 and spiral gear 17, which is selective depending upon the direction of rotation, a hub 20 is keyed to shaft 4 for a one-way driving clutch 21, such as a spiral spring clutch (Fig. 2). Clutch 21 is anchored to hub 20 to rotate therewith, and it encircles a hub on spiral gear 17. Upon one direction of rotation, spring clutch 21 tends to unwind, and hence it does not grip the hub of gear 17; while upon reverse rotation of shaft 4, spring 21 becomes tighter, whereupon a drive to gear 17 is effected. From this, it can be seen that the low speed drive to worm wheel 16 is continuously effective, while the high-speed drive to spiral driven gear 18 is effective only upon one direction of rotation.

Continuing now with the description for the high-speed drive, spiral driven gear 18 is internally splined to ride on the spiral spline 19 formed on the lower end of tube 6. The upper portion of gear 18 has an annular groove 22 to receive a means by which the gear may be biased to its uppermost position. As shown in Fig. 4, this means may comprise a yoke 23 having arms riding in annular groove 22, which yoke is biased upwardly by a spring 24 encircling a pin 25 secured in casing section 2. Yoke 23 forms part of a bushing 26 axially slidable on pin 25, the upper portion of spring 24 engaging this bushing to force it upwardly, and thereby lift spiral driven gear 18. The lower portion of the spiral driven gear is recessed as shown at 27 (Figs. 1, 5, and 7) with an internal diameter sufficient to extend over a drive pin 28 projecting laterally from shaft 5. Within recess 27 is positioned a washer 29 adapted to abut against pin 28 as the spiral driven gear moves downwardly on its spline connection with tube 6. Thus, when input drive shaft 4 is rotated in the proper direction to drive spiral gear 17, the spiral driven gear, constantly in mesh with gear 17 regardless of its axial position, initially rotates relatively to tube 6 on spiral spline 19 until its downward motion is arrested by engagement with washer 29 resting upon pin 28. Thereupon, the driving connection is completed for rotating tube 6. In a washing machine application, this gear ratio is selected to provide a relatively high-speed drive, suitable for centrifugal extraction of articles of clothing placed within a wash basket carried by hub 7.

As shown most clearly by Figs. 1 and 2, worm wheel 16 of the low-speed drive is journaled on a pin 30 secured in casing section 2, pin 30 being provided with appropriate oil conducting grooves 31. Gear 16 is retained upon pin or shaft 30 by an appropriate washer 32 and retaining ring 33. While the low speed drive may provide uni-directional rotation of shaft 5, in the present embodiment, I have shown an oscillatory drive including a crank arm 34 eccentrically journaled with respect to worm wheel 16 by means of a pin 35. The opposite end of crank arm or link 34 is eccentrically connected to a sector gear 36 by means of a connecting pin 37. Sector gear 36 is journaled with respect to the casing on a shaft 38 secured in place with a snap-type retaining ring 39. Thus, as worm wheel 16 rotates, sector gear 36 is driven with an oscillatory or to and fro motion through the eccentric connection with link 34. The drive from sector gear 36 to shaft 5 is accomplished through a drive member 40, here shown as a pinion meshing with the sector gear. Thus, pinion 40 is likewise driven continuously with an oscillatory motion.

For applications and uses within the contemplation of this invention, shaft 5 is to be intermittently driven. As previously described, the drive to pinion 40 is continuous upon either direction of input rotation through shaft 4. Therefore, a clutch connection is required between drive member 40 and shaft 5, member 40 being journaled on the lower end of the shaft. This clutch connection may take the form of a series of teeth 41 milled on the upper end of pinion 40, appropriately shaped to engage the transverse pin 28 projecting from shaft 5. When pinion 40 is in its lower position axially on shaft 5, as shown by Figs. 1 and 5, there is no connection between the upwardly facing teeth 41 and pin 28. Therefore, the drive to shaft 5 is not effective, even though pinion 40 is being driven. Pinion 40 is normally biased upwardly into a clutch-engaged position by a spring 42 having its upper end bearing against the lower surface of pinion 40 and its lower end resting in a cup 43 located in a depression 44 in pan 3 of the casing assembly. When pinion 40 moves upwardly to the position shown in Fig. 7, pin 28 in shaft 5 is engaged with one of the teeth 41, thereby completing the drive to output shaft 5.

One of the requirements of this invention is that the drive to shafts 5 and 6 shall not be effective simultaneously. Furthermore, it is also an essential of the mechanism to which this invention is applicable that the drive to shaft 5 shall not become effective at any time during high speed rotation of tube 6. As previously explained, spiral driven gear 18 moves downwardly on its spiral spline connection during transmission of power to tube 6. The downwardly extending annular portion on the lower part of gear 18 is arranged to clear pin 28 and to engage the upper surface of pinion 40. Thus, the downward movement of the spiral driven gear forces pinion 40 axially downward on shaft 5 to disengage the low speed drive clutch. It is clear, therefore, that at all times during transmission of torque to tube 6, pinion 40 is forced downwardly by spiral driven gear 18, to a clutch disengaged position, and the spring 42 compressed.

If the input drive is discontinued following transmission of high speed rotation through spiral driven gear 18 and tube 6, the mass which may be connected to tube 6 tends to continue rotation, whereupon it in effect becomes the driving member. There is, of course, some friction inherent in the system, and hence this reversal of the torque transmission through gear 18 will cause it to rise on spiral spline 19. This motion may be assisted if desired by the biasing means including spring 24 as described in connection with Fig. 4.

To prevent return of drive member 40 to its clutch engaged position with shaft 5, I provide in accordance with this invention cooperating means between the drive member and the shaft to prevent this axial movement toward the clutch engaged position until the rotational speed of drive member 40 exceeds the rotational speed of shaft 5, shaft 5 tending to rotate along with tube 6 by the frictional drag effects between these two co-axial members. In other words, during the high-speed rotation of tube 6, during which time member 40 has been moved to its clutch disengaged position, shaft 5 is free to rotate with the tube, and it assumes approximately the same speed as the tube, and it likewise continues to coast with the tube upon termination of power input. This means for preventing re-engagement of the low speed clutch is shown most clearly by the perspective expanded view of Fig. 9, showing the lower end 45 of shaft 5 machined or otherwise formed with a relatively deep slot 46 therein with intermediate shoulders 47 between end 45 and the bottom of slot 46, which shoulders are displaced rotationally from the slot. A counterbored recess 48 in the lower end of drive member 40 is adapted to receive an annular shift lock device 49 shown as having diametrically opposite inwardly projecting teeth 50 and 51. The shift lock 49 is journaled within the annular recess 48 in the drive member so that it is rotatable with respect thereto. It is held in position axially within recess 48 by a spring retaining ring 52 of the internal type. This retaining ring expands outwardly into a small annular groove, so that it remains substantially non-rotatable with respect to drive member 40. By maintaining relatively close tolerances between shift lock 49, retaining ring 52, and drive member 40, the shift lock tends to rotate with pinion 40 by the frictional effects between these components, although it may still be rotated with respect to pinion 40.

When the clutch between pinion 40 and shaft 5 is engaged, teeth 50 and 51 on the shift lock are near the inner end of slot 46 in shaft 5. When the drive is made effective to tube 6, at which time pinion 40 is forced downwardly to a clutch disengaged position, the teeth 50 and 51 of the shift lock are clear of slot 46 and lie in a position between shoulders 47 and the end of the shaft at 45. Since shaft 5 tends to rotate with tube 6 at a relatively high speed, while pinion 40 is driven at a much slower speed, shaft 5 moves in advance of pinion 40 and shift lock 49, whereupon the inwardly projecting teeth 50 and 51 assume a position axially in line with the shoulders 47 as shown by Fig. 6. As shaft 5 continues to rotate under the influence of the frictional drag of tube 6, the shift lock must rotate with the shaft at the same speed as shaft 5. Hence, if at any time the drive to tube 6 is discontinued due to termination of power to input shaft 4 or reversal of shaft 4, with the accompanying rise of spiral driven gear 18, the engagement of teeth 50 and 51 of the shift lock with the shoulders 47 on shaft 5 prevents re-engagement of the clutch under the influence of the biasing means provided by spring 42. This situation prevails until such time as drive member 40 is driven in a clockwise direction, as viewed in Fig. 6, at a speed exceeding the rotational speed of shaft 5. Since the frictional torque between pinion 40 and shift lock 49 exceeds any frictional torque effects between teeth 50 and 51 and shoulders 47, it may be seen that such rotation of pinion 40 in advance of shaft 5 in the clockwise direction will cause teeth 50 and 51 to rotate clear of shoulders 47, permitting the axial upward movement of drive member 40 to its clutch engaged position, said movement, of course, being due to biasing spring 42. Thus, in Figs. 7 and 8 the clutch is shown engaged, with teeth 50 and 51 in the relatively deep slot 46 as previously explained.

It should also be understood that shaft 5 cannot be engaged by pinion 40 even if the direction of rotation of the input shaft 4 is changed from that calling for power to high speed shaft 6, to that calling for power to shaft 5, while shaft 6 is coasting due to an inertia load attached to it, as for example the basket of a washing machine. Engagement of pinion 40 to shaft 5 can occur only after shaft 5, rotating with tube 6, has slowed down to a point where it equals the clockwise rotational speed of pinion 40.

For many of the applications to which this invention is applicable, an automatic brake is desired for tube 6. While the specific form of brake disclosed herein does not form a part of this invention but is disclosed and claimed in the aforementioned Dayton application Serial No. 404,434 it is illustrated herein for clarity and to complete the description of an exemplary form of a transmission embodying this invention. As shown most clearly by Figs. 1 and 3, a brake drum 53 is keyed, for example by a pin 54, to tube 6. Encircling this brake drum is brake band made up of an arcuate spring 55 with a layer of friction material or brake band lining 56 bonded or secured appropriately thereto. Spring 55 is pre-stressed so that it tends to compress at all times brake lining 56 into engagement with the outer surface of brake drum 53.

While the brake assembly, including drum 53 and brake band 55 normally tends to rotate along with tube 6, the motion of the brake band may be arrested by a brake latch arm 57. Latch arm 57 has a hook portion 58 adapted to engage brake band 55. This latch arm is keyed to a shaft 59 which is journaled in the central section 2 of the casing. A torsion spring 60 encircling the upper end of shaft 59 has one of its ends bearing against the casing, with its other end bearing against latch arm 57, to bias it inwardly into engagement with the brake band. At the lower end of shaft 59 and keyed thereto is an actuating arm 61, as shown by Figs. 1 and 2. This actuating arm in cooperation with the inclined surface 62 on spiral driven gear 18 provides a means by which latch arm 57 is always moved to its disengaged position during power drive to tube 6. It will be recalled that during power drive to tube 6, spiral driven gear 18 moves downwardly, whereupon the operating arm 61 is forced outwardly by the inclined surface 62, which outward movement results in rotation of shaft 59, likewise rotating latch arm 57 to a position clear of the brake band, as shown in Fig. 3. However, as soon as the drive through spiral gear 18 terminates, the spiral gear moves upwardly, permitting actuating arm 61 to rotate, carrying with it the brake latch arm 57, so that the latch arm engages brake band 55 to provide the desired braking force to tube 6.

To review briefly the operation of this drive mechanism, let it be assumed initially that input driving shaft 4 is rotated in a clockwise direction as viewed from the right-hand side of Fig. 2. Clutch spring 21 tends to unwind, and hence substantially no torque is transmitted to spiral driving gear 17. Worm 15, which is pinned to input driving shaft 4, drives worm wheel 16, and through the subsequent linkages and gears provides input driving torque to drive member 40. While an oscillatory drive to member 40 is shown here, it is equally within the intent of this invention that the drive to member 40 could be a uni-directional, relatively low-speed drive, by comparison with the speed of rotation of tube 6. The oscillatory drive of sector gear 36 to pinion 40 results in oscillation of shaft 5, since the clutch between pinion 40 and shaft 5 is engaged; or in other words, the components are in the position illustrated by Fig. 7. When the direction of input rotation to shaft 4 is reversed, the spring clutch 21 engages spiral gear 17 with shaft 4 to provide input drive to spiral driven gear 18. The initial rotation of gear 18 results in its downward movement on tube 6 through its spiral spline connection therewith. By means of the coaxial relationship between gear 18 and pinion 40, the clutch between pinion 40 and shaft 5 is disengaged by this downward movement of gear 18. Thus, the shift from a drive to shaft 5 to the drive to shaft 6 is entirely automatic depending upon the direction of rotation of shaft 4. Shaft 5 is now free to rotate with tube 6, and hence it tends to assume the same speed.

When the transmission of torque through spiral driven gear 18 is discontinued, this gear rises under the combined influence of the reversal of torque transmission and the biasing spring 24 (Fig. 4). Even though drive pinion 40 is biased upwardly toward a clutch engaged position by spring 42, it does not return to its upward position as a result of the cooperation of the shift lock journaled in pinion 40 with the shoulder 47 formed on the end of shaft 5. The pinion 40 can move upward to engage shaft 5 only after its clockwise motion has rotated the shift lock teeth 50 and 51 off shoulders 47 into a position as shown in Fig. 8. This can occur only when shaft 5 is stationary, or, when shaft 5 rotates at a clockwise rate which is slower than the clockwise rate of rotation of pinion 40. In any event the power input into shaft 4 must be in such a direction as to call for low speed output of shaft 5.

From the above description, it is seen that I have provided a drive mechanism automatically shifting from transmission from one output shaft to a second output shaft selectively and dependent solely upon the direction of input rotation. This construction is a simplification over the mechanism disclosed and claimed in the aforementioned Dayton application, and in particular it is a simplification with respect to the means for controlling engagement of the clutch between drive member 40 and shaft 5, following a termination of the drive to tube 6.

While this invention has been described by reference to a particular embodiment thereof, it is to be understood that numerous modifications may be made by those skilled in the art without actually departing from the invention. It is, therefore, the aim of the appended claims to cover all such equivalent variations as come within the true spirit and scope of the invention.

What I claim as new and desire to secure by Letters Patent of the United States is:

1. A drive mechanism comprising an input shaft, a high-speed shaft, a driving connection between said input shaft and said high-speed shaft including a selectively operable clutch, a low-speed shaft having a limited frictional coupling with said high-speed shaft, means for driving said low-speed shaft from said input shaft including a drive member journaled on said low speed shaft axially and rotatably movable thereon, a low-speed clutch for engaging said drive member to said low-speed shaft responsive to axial movement of said drive member in one direction, means responsive to the drive of said high-speed shaft for moving said drive member in the opposite axial direction to disengage said clutch, and cooperating means between said member and said low-speed shaft preventing axial movement of said drive member in said one direction so long as said low-speed shaft overruns said drive member due to said limited frictional coupling with said high-speed shaft, said cooperating means comprising shoulder means formed on said shaft and shift lock means rotatably secured on said drive member for engaging said shoulder means.

2. A drive mechanism for an oscillatory output shaft and a rotary output shaft comprising a drive member for oscillating said oscillatory shaft journaled thereon and axially movable with respect thereto, a clutch between said oscillatory shaft and said drive member engaged by relative axial movement to an engaged position, biasing means to move said drive member into said clutch engaged position, means to move said drive member to a disengaged position responsive to drive of said rotary output shaft, means operating said drive member with an oscillatory motion, and cooperating means between said drive member and oscillatory shaft preventing axial movement to a clutch engaged position responsive to continuous relative rotation therebetween in a given direction, said cooperating means comprising shoulder means formed on said shaft and shift lock means rotatably secured on said drive member for engaging said shoulder means.

3. In a transmission, a shaft periodically rotating in a first direction, a drive member journaled on said shaft and axially movable thereon, means driving said member continuously with an oscillatory motion, a clutch between said shaft and drive member whereby said shaft may be driven with an oscillatory motion, said clutch being engaged by axial movement of said drive member relative to said shaft, means biasing said clutch into engagement, and means for retaining said clutch out of engagement during relative rotation in said first direction of said shaft with respect to said member while permitting axial movement into engagement upon opposite relative rotation, whereby said oscillatory drive cannot become effective until continuous rotation of said shaft in said first direction decreases in speed to an amount not exceeding rotational speed during oscillation, said last mentioned means comprising shoulder means formed on said shaft and a shift lock element journaled in said drive member for engaging said shoulder means.

4. In a transmission, a shaft periodically rotating in a first direction at one speed, a drive member journaled on said shaft and axially movable thereon, means continuously driving said member at a slower speed, a clutch between said shaft and drive member whereby said shaft may be driven at said slower speed, said clutch being engaged by axial movement of said drive member relative to said shaft, means biasing said clutch into engagement, shoulder means formed on said shaft, and a shift lock element mounted on said drive member and engaging said shoulder means to retain said clutch out of engagement during relative rotation in said first direction of said shaft with respect to said member while disengaging from said shoulder means to permit axial movement into engagement upon opposite relative rotation, whereby said slower speed drive cannot become effective until continuous rotation of said shaft in said first direction decreases in speed to an amount not exceeding rotational speed of said slower drive.

5. In a drive mechanism, a shaft, a drive member journalled on said shaft, a clutch between said drive member and said shaft engaged in one relative axial position and disengaged in a second position, means biasing said clutch into engagement, shoulder means formed on said shaft, and a shift lock mounted on said drive member and engaging said shoulder means to hold said clutch out of engagement except during relative rotation between said shaft and drive member in one direction.

6. In a transmission, a shaft periodically rotated in a first direction, a drive member journaled on said shaft and movable axially with respect thereto, means driving said member with an oscillatory motion, a clutch between said member and shaft engaged by axial movement therebetween, means biasing said clutch toward an engaged position, and means preventing relative axial movement between said member and said shaft toward the clutch engaged position during relative rotation of said shaft with respect to said member in said first direction, said means comprising shoulders formed on said shaft defining two axial positions thereon, said shoulders being angularly displaced, a shift lock journaled in said drive member in a fixed axial position, said shift lock having means engageable with at least one shoulder, thereby restraining axial movement of said member on said shaft to a clutch engaged position, and means providing limited friction between said shift lock and said drive member whereby relative rotation between said member and shaft in the opposite direction disengages said shift lock from said one shoulder.

7. In a drive mechanism, a shaft, a drive member journaled on said shaft, a clutch between said drive member and said shaft engaged in one axial position and disengaged in a second position, means biasing said clutch into engagement, said shaft having an axial slot in the end thereof upon which said drive member is journaled and also having an intermediate shoulder angularly displaced with respect to said slot, and a shift lock journaled in said drive member with an inwardly projecting portion receivable in said slot for clutch engagement and engageable on said shoulder to retain said clutch in disengaged position, the frictional engagement between said shift lock and drive member exceeding the corresponding engagement between said shift lock and said shoulder.

8. In a drive mechanism, a shaft, a drive member journaled on said shaft, a clutch between said drive member and said shaft engaged in one relative axial position and disengaged in a second position, means biasing said clutch into engagement, means defining at least one shoulder and an axial slot in the end of said shaft, and a shift lock rotatably secured within said drive member and having an internal projection engageable with said shoulder of said shaft for retaining said clutch in disengaged position, said projection being receivable within said slot to permit clutch engagement.

9. In a drive mechanism, a shaft, a drive member journaled on said shaft, a clutch between said drive member and said shaft engaged in one axial position and disengaged in a second position, means biasing said clutch into engagement, means defining multiple axial levels on the end of said shaft upon which said drive member is journaled, said levels being angularly displaced, and a shift lock rotatably secured within said drive member and having means engageable selectively with said axial levels depending upon the direction of rotation of said drive member with respect to said shaft.

10. A drive mechanism for an oscillatory output shaft and a rotary output shaft comprising, a drive member for said oscillatory output shaft journaled thereon and axially movable with respect thereto, a clutch between said oscillatory shaft and said drive member engaged by relative axial movement to an engaged position, biasing means to move said drive member into said clutch engaged position, means to move said drive member to a disengaged position responsive to transmission of power to said rotary output shaft, means defining multiple axial levels on the end of said oscillatory output shaft upon which said drive member is journaled, and a shift lock carried by said drive member engageable selectively on said levels whereby said clutch may be held out of engagement.

11. A drive mechanism comprising a reversible input shaft, a high-speed output shaft, a driving connection between said input shaft and said high-speed shaft including selectively operable engaging means depending upon direction of input shaft rotation, an oscillatory output shaft coaxial and journalled with respect to said high-speed shaft, said oscillatory shaft tending to rotate at high-speed with said high-speed shaft, an oscillatory driving member journalled on said oscillatory shaft, a clutch between said oscillatory driving member and its shaft engaged by relative axial movement, means biasing said clutch into engagement, means moving said clutch to a disengaged position responsive to transmission of power to said high-speed shaft, and cooperating means between said oscillatory output shaft and its associated driving member preventing re-engagement of said clutch when said oscillatory shaft is rotating with said high-speed shaft at a velocity exceeding maximum velocity of said driving member, said cooperating means comprising shoulder means formed on said oscillatory output shaft and shift lock means journaled on said oscillatory driving member for engaging said shoulder means.

References Cited in the file of this patent
UNITED STATES PATENTS

| | | |
|---|---|---|
| 2,111,143 | Geldhof | Mar. 15, 1938 |
| 2,571,438 | Gerhardt | Oct. 16, 1951 |
| 2,667,252 | Meyer | Jan. 26, 1954 |
| 2,720,953 | Dayton | Oct. 18, 1955 |
| 2,728,428 | Cohen | Dec. 27, 1955 |